United States Patent [19]

Bonfield

[11] 3,932,593

[45] Jan. 13, 1976

[54] PROCESS FOR THE SYNTHESIS OF AMMONIUM NITRITE

[75] Inventor: John H. Bonfield, Basking Ridge, N.J.

[73] Assignee: Allied Chemical Corporation, New York, N.Y.

[22] Filed: May 11, 1973

[21] Appl. No.: 359,292

[52] U.S. Cl. ............................................... 423/385
[51] Int. Cl.² ......................................... C01B 21/20
[58] Field of Search ............................ 423/351, 385

[56] References Cited
UNITED STATES PATENTS 2,606,813   8/1952   Kahr ..................................... 423/385
2,797,144   6/1957   Joris..................................... 423/385
2,805,122   9/1957   Bostian et al. ....................... 423/385
2,805,123   9/1957   Bostian ................................ 423/385

FOREIGN PATENTS OR APPLICATIONS 1,146,039   3/1963   Germany ............................. 423/385

Primary Examiner—Earl C. Thomas
Attorney, Agent, or Firm—Michael S. Jarosz; Jack B. Murray, Jr.

[57]     ABSTRACT

An improved process for producing ammonium nitrite in high yield which comprises contacting a gaseous stream containing nitric oxide and oxygen with an aqueous solution containing a basically reacting ammonium compound in the presence of free carbon dioxide.

7 Claims, 1 Drawing Figure

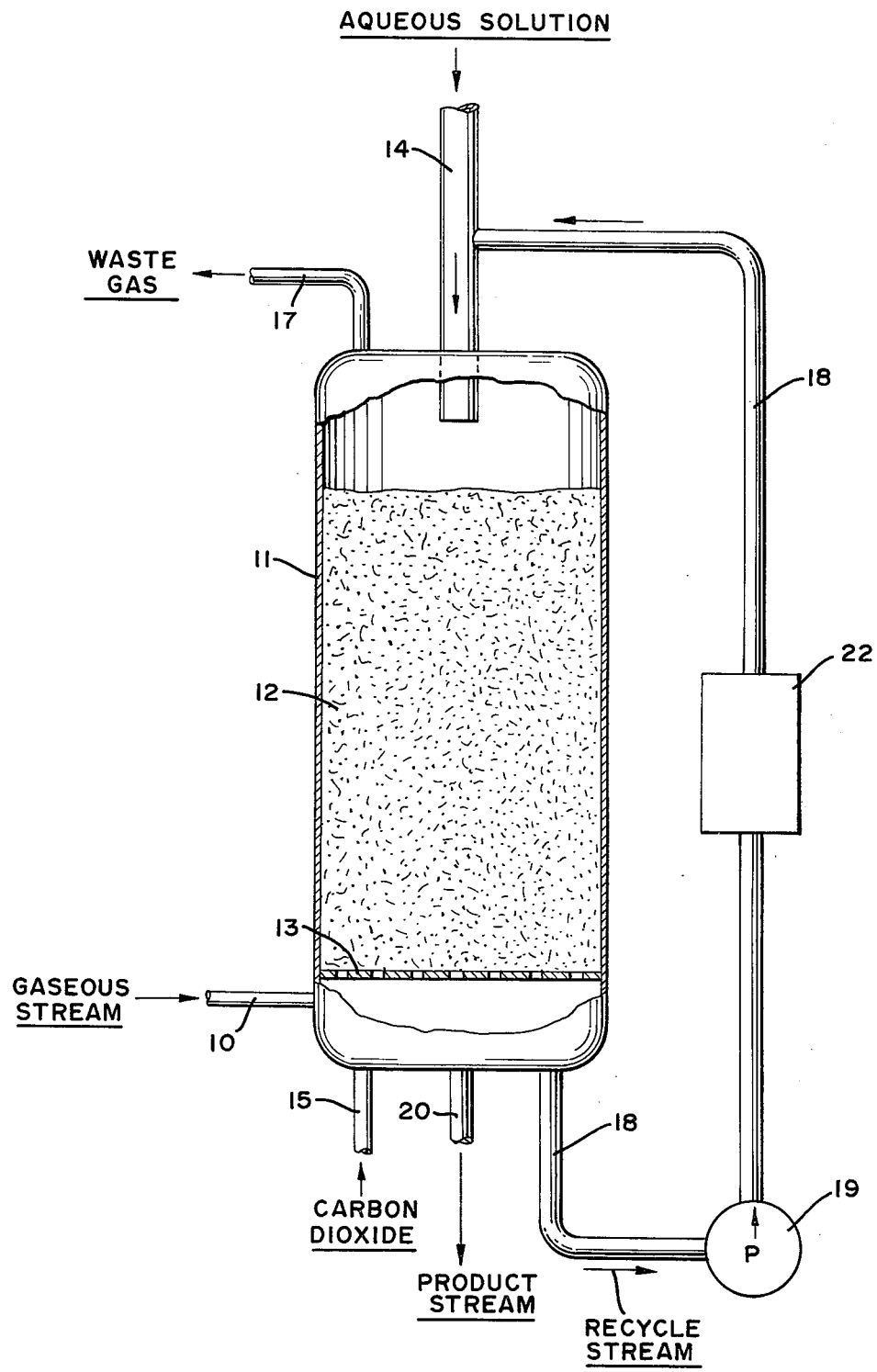

PROCESS FOR THE SYNTHESIS OF AMMONIUM NITRITE

BACKGROUND OF THE INVENTION

1. Field of the invention

This invention relates to the production of ammonium nitrite and more particularly to an improved process for producing ammonium nitrite by contacting an aqueous solution containing a basically reacting ammonium compound with a gaseous stream containing nitric oxide and oxygen in the presence of free carbon dioxide.

2. Description of the prior art

Ammonium nitrite is produced commercially by contacting an aqueous solution containing a basically reacting ammonium compound with gaseous nitric oxide and oxygen. This process, which is as described in U.S. Pat. No. 2,805,122 and 2,805,123 (issued to Bostian et al. in 1957), involves physical absorption of the gaseous nitric oxide and oxygen by the aqueous solution, together with a multiplicity of gas phase and liquid phase reactions. Such a process results in substantial yield loss due to the formation of undesirable ammonium nitrate, nitrogen and ammonia

SUMMARY OF THE INVENTION

In accordance with the present invention, an aqueous solution containing a basically reacting ammonium compound is contacted with a gaseous stream containing nitric oxide and oxygen in a reaction zone into which free carbon dioxide is introduced, whereby yields of ammonium nitrite significantly higher than those obtained by prior art methods are produced.

The introduction of free carbon dioxide into the reaction zone of the process of the present invention reduces the formation of ammonium nitrate, nitrogen and ammonia and provides higher yields of ammonium nitrite, up to at least about 10 percent or more, than attained by prior art methods. Such yield improvement reflects a significant cost advantage due to the large tonnages of ammonium nitrite which are used annually by industry, for example, in the production of hydroxylamine compounds. Hydroxylamine compounds are used in large quantities for the manufacture of caprolactam via an intermediate, cyclohexanone oxime.

DESCRIPTION OF THE DRAWINGS

The accompanying drawing is a diagrammatic flowsheet illustrating the preferred embodiment of the present invention to be described hereinafter.

DETAILED DESCRIPTION OF THE INVENTION

When in accordance with the process of the present invention a gaseous stream containing nitric oxide and oxygen is contacted with an aqueous solution containing a basically reacting ammonium compound, the reaction of nitric oxide, oxygen and the ammonium compound to form ammonium nitrite is believed to occur by a series of step-wise reactions. The overall reaction to form ammonium nitrite may be illustrated by the following equation in which ammonium bicarbonate is employed as the basically reacting ammonium compound:

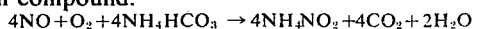
$$4NO + O_2 + 4NH_4HCO_3 \rightarrow 4NH_4NO_2 + 4CO_2 + 2H_2O$$

Gaseous streams which may be used for the practice of this invention can be obtained by catalytic combustion of ammonia-air mixtures, by electric arc combustion of air, by thermal fixation of the nitrogen in the air, or as by-product gas from other chemical processes. Gaseous streams containing nitric oxide produced by catalytic combution of ammonia-air mixtures are preferred because they are ordinarily the most economical for the most efficient practice of this invention. In particular, gaseous streams derived from combustion of ammonia-air mixtures having from about 6 to 9 volume percent ammonia are especially preferred for their economy and efficiency in the process of the present invention. Such gases contain at the oxidizer exit approximately 6 to 10 volume percent nitric oxide on an anhydrous and ammonia free basis, together with approximately 8 to 12 volume percent oxygen and 60 to 80 volume percent nitrogen.

When a gaseous stream containing nitric oxide is employed which does not also contain oxygen, oxygen from an oxygen containing gas, conveniently air, may be introduced into the gaseous stream.

It has been unexpectedly found that higher yields of ammonium nitrite and significant reduction in formation of ammonium nitrate, nitrogen and ammonia are obtained by the introduction of free carbon dioxide into the reaction zone. While various means may be used to introduce free carbon dioxide into the reaction zone of the process of the present invention, such as by incorporating the carbon dioxide in the gaseous stream which contains the nitric oxide and oxygen, the process in its preferred form involves injecting the carbon dioxide, either incrementally or continuously, directly into the reaction zone. The free carbon dioxide is generally introduced into the reaction zone in an amount corresponding to a concentration of from about 1 to 40, and preferably from about 15 to 30 volume percent carbon dioxide in the gaseous stream containing the nitric oxide. Use of concentrations of carbon dioxide less than about 1 volume percent does not result in substantially higher ammonium nitrite yields, and use of concentrations of carbon dioxide greater than about 40 volume percent tends to become uneconomical.

The term "basically reacting ammonium compound" as used herein is intended to include one or more members of the group consisting of ammonium carbonate, ammonium bicarbonate and ammonium hydroxide. The basically reacting ammonium compound employed in the process of the present invention may be conveniently incorporated in the aqueous solution prior to the introduction of this solution into the reaction zone for ammonium nitrite production.

While the selected basically reacting ammonium compound may be employed in the aqueous solution in various concentrations, when ammonium bicarbonate is used as the basically reacting ammonium compound, the concentration of the compound in the aqueous solution is generally from about 1–21 weight percent, and is preferably from about 4–20 weight percent. When ammonium carbonate is employed as the basically reacting ammonium compound, the concentration of the compound in the aqueous solution is generally from about 1 to 30 weight percent, and preferably from about 4 to 20 weight percent. More than about 21 weight percent ammonium bicarbonate or more than about 30 weight percent ammonium carbonate is not possible under normal operating conditions due to the limit of solubility of these compounds in water. Where ammonium hydroxide is employed as the basically reacting ammonium compound, the concentration of ammonium hydroxide in the aqueous solution is generally from about 1 to 28 weight percent, and preferably from about 4 to 16 weight percent.

The aqueous solution in the process of the present invention should be maintained at a pH of at least about 6.75, thereby avoiding significant decomposition of the ammonium nitrite product which occurs when the aqueous solution has a pH below about 6.75. In its preferred form, the process employs an aqueous solution that has a pH of between about 6.75 and 7.0.

When the aqueous solution which contains the basically reacting ammonium compound is characterized by a $CO_3^=/NH_4^+$ ratio of less than about 0.5, highest yields of ammonium nitrite are obtained when a temperature of between about $-5°$ and $35°C.$, and preferably between about $-5°$ and $5°C.$, is employed. When this ratio is greater than about 0.5, a temperature between about $0°$ to $10°C.$, and preferably between about $0°$ and $5°C.$, is employed to obtain highest ammonium nitrite yields. The pressure employed in the process of the present invention is not critical and typically varies between about 0.5 and 1.5 atmospheres.

The process of the present invention may be carried out in either a batch or a continuous manner. This invention may be illustrated by reference to the accompanying drawing wherein the process is carried out in a continuous manner. A gaseous stream such as produced by ammonia oxidation containing nitric oxide and oxygen is passed via line 10 into absorption chamber 11 at a point in the lower portion thereof below packing 12, e.g., 3/8 inch Berl Saddle packing, supported on perforate plate 13. Free gaseous carbon dioxide is introduced via line 15 into chamber 11 below perforate plate 13. The gaseous stream and free gaseous carbon dioxide pass upwardly therethrough in countercurrent contact with an aqueous solution containing a basically reacting ammonium compound e.g., a mixture of ammonium carbonate and ammonium bicarbonate. The aqueous solution is introduced to the upper portion of chamber 11 via line 14 and flows downwardly over the surface of packing 12. A portion of the aqueous solution enriched in ammonium nitrite is withdrawn as recycle stream from chamber 11 via line 18, and is passed by pump 19 through cooling apparatus 22 wherein the recycle stream is cooled to the desired temperature, e.g., $5°C.$ The recycle stream passing from cooling apparatus 22 is recycled via line 18 to line 14. A procuct stream comprising aqueous solution enriched in ammonium nitrite and containing residual basically reacting ammonium compounds is withdrawn from chamber 11 via line 20. Waste gas from chamber 11 is discharged via line 17.

When a batch process is employed, it is desirable that a portion of the aqueous solution in the absorption chamber be continuously withdrawn and recycled to the chamber, thereby effecting a more complete contacting of the basically reacting ammonium compound with the gaseous nitric oxide.

Any standard cooling apparatus may be used to cool the recycle stream, e.g., a shell and tube heat exchanger or a cooling coil. Further, the pump employed to cause the recycle stream to flow through line 18 may be any of the various standard pumps employed with similar fluids.

In a continuous process, such as employed in Examples 1 and 2 below, the term "yield of ammonium nitrite" as used herein is calculated by the following equation: Yield of ammonium nitrite = [moles per hour $NH_4NO_2$ removed with product stream from the tower] ÷ [(moles per hour NO sparged to the tower) + (moles per hour $NH_4^+$ in the form of $NH_4HCO_3$, $(NH_4)_2CO_3$ and $NH_4OH$ fed to the tower)-(moles per hour $NH_4^+$ in the form of $NH_4NO_2$, $NH_4NO_3$, $(NH_4)_2CO_3$, $NH_4HCO_3$ and $NH_4OH$ removed with product stream from the tower)].

In a batch process, such as is employed in Examples 3 4 and 5 below, the term "yield of ammonium nitrite" as used herein is calculated by the following equation: Yield of ammonium nitrite=[moles $NH_4NO_2$ in reaction mixture]÷[(moles NO sparged to the tower) + (moles $NH_4^+$ in the form of $NH_4HCO_3$, $(NH_4)_2CO_3$ and $NH_4OH$ in aqueous solution charged to the tower) − (moles $NH_4^+$ in the form of $NH_4NO_2$, $NH_4HCO_3$, $(NH_4)_2CO_3$ and $NH_4OH$ in reaction mixture)]. In the above equation the reaction mixture is the aqueous solution enriched in ammonium nitrite which is contained in the tower at the point in time during the process at which the yield is to be determined. Such a determination, of course, may be conveniently made either at the conclusion of the process or during the process by withdrawing an aliquot from the reaction mixture for analysis.

The present invention may be further illustrated by reference to the following examples:

EXAMPLE 1

A packed tower as shown in the accompanying drawing and consisting of a 3-inch ID pyrex tube, packed to a height of 56 inches with 3/8 inch Berl Saddle packing, was continuously fed at a temperature of $16°C.$ and at atmospheric pressure with an aqueous solution containing 16 weight percent $NH_4HCO_3$ at a flow rate of about 36 moles of solution per hour, thereby introducing 1.50 moles per hour of $NH_4^+$ in the form of $NH_4HCO_3$ to the tower. The solution in the tower was continuously and countercurrently sparged with 0.95 mole per hour of nitric oxide contained in a gaseous stream having the volume percent composition: 9% NO, 43% $N_2$, and 48% air. A portion of the aqueous solution enriched in ammonium nitrite was continuously recycled to the aqueous solution feed. A product stream was continuously withdrawn from the tower at a flow rate of about 36 moles of solution per hour, thereby withdrawing 0.78 mole per hour ammonium nitrite and 1.39 moles per hour of $NH_4^+$ in the form of ammonium nitrite and residual $NH_4HCO_3$. The percent yield of ammonium nitrite was calculated to be about 73 percent.

In a second run, the above tower was continuously fed with an aqueous solution of the above composition at a flow rate of about 36 moles of solution per hour, thereby introducing 1.48 moles per hour of $NH_4^+$ in the form of $NH_4HCO_3$ to the tower. The solution in the tower was continuously and countercurrently sparged under the above temperature and pressure conditions with 0.95 mole per hour of nitric oxide contained in a gaseous stream having the volume percent composition: 6% NO, 32% $N_2$, 35% air and 27% carbon dioxide. A portion of the aqueous solution enriched in ammonium nitrite was continuously recycled to the aqueous solution feed. A product stream was continuously withdrawn from the tower at a flow rate of about 36 moles of solution per hour, thereby withdrawing 0.82 mole per hour ammonium nitrite and 1.40 moles per hour $NH_4^+$ in the form of ammonium nitrite and residual $NH_4HCO_3$. The percent yield of ammonium nitrite in the product stream was calculated to be about 79%.

Thus about a 6% higher yield of ammonium nitrite was effected by the introduction of free carbon dioxide gas into the reaction zone.

EXAMPLE 2

A packed tower, as employed in Example 1, was continuously fed at a temperature of 15°C. and at atmospheric pressure with an aqueous solution containing 4 weight percent $(NH_4)_2CO_3$ and 7 weight percent $NH_4HCO_3$ at a flow rate of 883 grams per hour, thereby introducing 1.52 moles per hour of $NH_4^+$ in the form of $NH_4NCO_3$ and $(NH_4)_2CO_3$ to the tower. The solution in the tower was continuously and countercurrently sparged with 0.95 mole per hour nitric oxide contained in a gaseous stream having the volume percent composition: 9% NO, 43% $N_2$ and 48% air. A portion of the aqueous solution enriched in ammonium nitrite was continuously recycled to the aqueous solution feed. A product stream was continuously withdrawn from the tower at a flow rate of 883 grams per hour, thereby withdrawing 0.76 mole per hour ammonium nitrite and 1.38 moles per hour $NH_4^+$ in the form of ammonium nitrite and residual basically reacting ammonium compound. The percent yield of ammonium nitrite was calculated to be about 70 percent.

In a second run, the above tower was continuously fed with an aqueous solution of the above composition at a flow rate of 812 grams per hour, thereby introducing 1.39 moles per hour of $NH_4^+$ in the form of $(NH_4)_2CO_3$ and $NH_4HCO_3$ to the tower. The solution was continuously and countercurrently sparged under the above temperature and pressure conditions with 0.95 mole per hour of nitric oxide contained in a gaseous stream having the volume percent composition: 6% NO, 32% $N_2$, 35% air and 27% carbon dioxide. A portion of the aqueous solution enriched in ammonium nitrite was continuously recycled to the aqueous solution feed. A product stream was continuously withdrawn from the tower at a flow rate of 812 grams per hour, thereby withdrawing 0.745 mole per hour ammonium nitrite and 1.32 moles per hour $NH_4^+$ in the form of ammonium nitrite and residual $(NH_4)_2CO_3$ and $NH_4HCO_3$. The percent yield of ammonium nitrite was calculated to be about 77%. Thus, about 7 percent higher yield of ammonium nitrite was effected by the introduction of free carbon dioxide gas to the reaction zone.

EXAMPLE 3

In a batch operation, a packed tower, as employed in Example 1, was charged with 1 liter of an aqueous solution containing 14 weight percent of $NH_4HCO_3$, i.e., 1.994 moles of $NH_4^+$. The solution in the tower was countercurrently sparged for a period of 90 minutes at a temperature of 16°C. and at atmospheric pressure with 0.95 mole per hour of nitric oxide contained in a gaseous stream having the volume percent composition: 9% NO, 43% $N_2$ and 48% air. At the conclusion of the 90 minute period, the reaction mixture, was found to contain 1.171 moles ammonium nitrite and 1.825 moles $NH_4^+$ in the form of ammonium nitrite and residual $NH_4HCO_3$. The percent yield of ammonium nitrite was calculated to be about 74 percent.

In a second run, the packed tower was again charged with 1 liter of an aqueous solution of the above composition. The solution was countercurrently sparged for a 90 minute period at a temperature of 16°C. and at atmospheric pressure with 0.95 mole per hour of nitric oxide contained in a gaseous stream having a volume percent composition: 6% NO, 32% $N_2$, 35% air and 27% $CO_2$. At the conclusion of the 90 minute period, the reaction mixture was found to contain 1.231 moles ammonium nitrite and residual $NH_4HCO_3$. The percent yield of ammonium nitrite was calculated to be about 82%. Thus, about a 8 percent higher yield of ammonium nitrite was effected by the introduction of free carbon dioxide into the reaction zone.

EXAMPLE 4

In a batch operation, a packed tower, as employed in Example 1, was charged with 1 liter of an aqueous solution containing 4 weight percent $(NH_4)_2CO_3$ and 7 weight percent $NH_4HCO_3$, i.e., 3.53 moles of $NH_4^+$. The solution in the tower was countercurrently sparged for a 90 minute period at a temperature of 5°C. and at atmospheric pressure with 0.95 mole per hour of nitric oxide contained in a gaseous stream and having the volume percent composition: 9% NO, 43% $N_2$ and 48% air. At the conclusion of the 90 minute period, the reaction mixture was found to contain 1.242 moles of ammonium nitrite and 3.21 moles of $NH_4^+$ in the form of ammonium nitrite and residual $(NH_4)_2CO_3$ and $NH_4CO_3$. The percent yield of ammonium nitrite was calculated to be about 71 percent.

In a second run, the packed tower was again charged with 1 liter of an aqueous solution of the above composition. The solution in the tower was countercurrently sparged for a 90 minute period at a temperature of 5°C. and at atmospheric pressure with 0.95 moles per hour of nitric oxide contained in a gaseous stream having the volume percent composition: 6% NO, 32% $N_2$, 35% air and 27% CO. At the conclusion of the 90 minute period, the reaction mixture was found to contain 1.24 moles of ammonium nitrite and 3.415 moles of $NH_4^+$ in the form of ammonium nitrite and residual $(NH_4)_2CO_3$ and $NH_4HCO_3$. The percent yield of ammonium nitrite was calculated to be about 81 percent. Thus, about a 10 percent higher yield of ammonium nitrite was effected by the introduction of free carbon dioxide into the reaction zone.

EXAMPLE 5

A packed tower as employed in Example 1 was charged with an aqueous solution containing ammonium carbonate and ammonium bicarbonate in an amount such that 3.69 moles of $NH_4^+$ and 2.51 moles of $CO_2^=$ were present in the solution in the form of ammonium carbonate and ammonium bicarbonate. The solution in the tower was countercurrently sparged for a period of 76.5 minutes at a temperature of 15°C. and at atmospheric pressure with 1.9 moles per hour of nitric oxide contained in a gaseous stream having the volume percent composition: 9% NO, 42% $N_2$ and 48% air. At the conclusion of the 76.5 minute period, the reaction mixture was found to contain 1.973 moles ammonium nitrite and 3.23 moles of $NH_4^+$ present in the form of ammonium nitrite and residual $NH_4HCO_3$ and $(NH_4)_2CO_3$. The percent yield of ammonium nitrite was calculated to be about 68.5 percent.

Further runs were made employing the above batch process with varying concentrations of free carbon dioxide incorporated in the gaseous stream. After each run, the composition of the reaction mixture was determined. The date obtained from these runs are shown in the table below wherein the percent yield of ammonium nitrite with the various concentrations of free carbon dioxide are set forth:

TABLE

| Free Carbon Dioxide Percent By Volume Of Gaseous Stream | Percent Yield Of Ammonium Nitrite |
|---|---|
| 3.94 | 72.1 |
| 5.7 | 75.1 |
| 7.88 | 75.6 |
| 12.94 | 75.8 |
| 24.5 | 78.6 |

Various modifications will be apparent to one skilled in the art and it is not intended that this invention be limited to the details in the specific examples presented by way of illustration. Accordingly, the scope of the invention is limited only by the appended claims.

I claim

1. In a process for producing ammonium nitrite by contacting in a reaction zone a gaseous stream comprising at least, in part, nitric oxide and molecular oxygen-containing gas with an aqueous solution having a pH of at least about 6.75 and containing a basically reacting ammonium compound, the improvement which comprises introducing into said reaction zone free carbon dioxide in an amount of from about 15 to 30 volume percent carbon dioxide of said gaseous stream.

2. The process as defined in claim 1 wherein said basically reacting ammonium compound is a member selected from the group consisting of ammonium carbonate, ammonium bicarbonate, ammonium hydroxide and mixtures thereof.

3. The process as defined in claim 1 wherein said free carbon dioxide is injected directly into said reaction zone.

4. The process as defined in claim 1 wherein said free carbon dioxide is incorporated in said gaseous stream.

5. The process as defined in claim 1 wherein said basically reacting ammonium compound is ammonium bicarbonate.

6. The process as defined in claim 1 wherein said basically reacting ammonium compound is ammonium carbonate.

7. The process as defined in claim 1 wherein said basically reacting ammonium compound is ammonium hydroxide.

* * * * *